(12) United States Patent
Simazu et al.

(10) Patent No.: US 6,500,573 B1
(45) Date of Patent: Dec. 31, 2002

(54) HUMIDIFER DEVICE FOR FUEL CELLS AND OPERATING SYSTEM THEREOF

(75) Inventors: Takashi Simazu; Hiroshi Aoki; Tomohisa Wakasugi; Takahiko Asaoka; Kazutaka Hiroshima; Yutaka Ohya; Katsuhito Yamada, all of Aichi-ken (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/391,617

(22) Filed: Sep. 7, 1999

(30) Foreign Application Priority Data

Sep. 7, 1998 (JP) .......................................... 10-252171

(51) Int. Cl.$^7$ ................................................. H01M 8/04
(52) U.S. Cl. ........................................ 429/22; 429/24
(58) Field of Search ................................ 429/13, 22, 24

(56) References Cited

U.S. PATENT DOCUMENTS

| | | | |
|---|---|---|---|
| 4,670,359 A | * 6/1987 | Beshty et al. ................. | 429/17 |
| 5,360,679 A | * 11/1994 | Buswell et al. ................ | 429/19 |
| 5,432,020 A | 7/1995 | Fleck | |
| 5,434,016 A | 7/1995 | Benz et al. | |
| 5,645,950 A | 7/1997 | Benz et al. | |
| 5,658,681 A | * 8/1997 | Sato et al. ..................... | 429/13 |
| 5,686,196 A | * 11/1997 | Singh et al. ................... | 429/17 |
| 5,786,104 A | 7/1998 | Black et al. | |
| 5,837,393 A | * 11/1998 | Okamoto ....................... | 429/20 |

FOREIGN PATENT DOCUMENTS

JP 5-54900 3/1993

* cited by examiner

*Primary Examiner*—Gabrielle Brouillette
*Assistant Examiner*—Monique Wills
(74) *Attorney, Agent, or Firm*—Oblon, Spivak, McClelland, Maier & Neustadt, P.C.

(57) ABSTRACT

A humidifier device for use in fuel cells comprising a mist humidifier unit for adding mists to process gas supplied to an electrolyte equipped in a fuel cell and a humidifier unit control device for intermittently operating the mist humidifier unit in accordance with operating condition of the fuel cell.

21 Claims, 3 Drawing Sheets

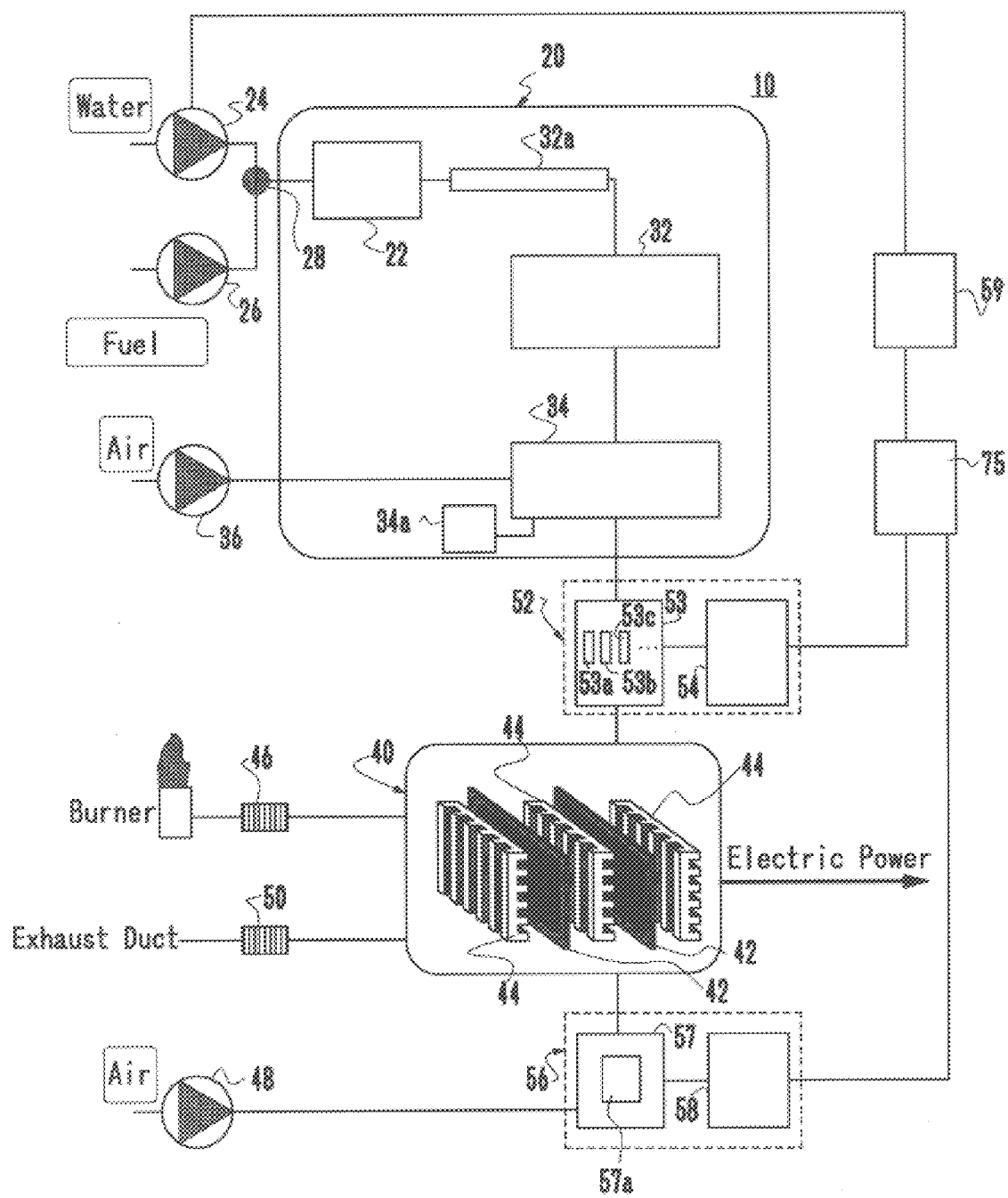
F I G. 1

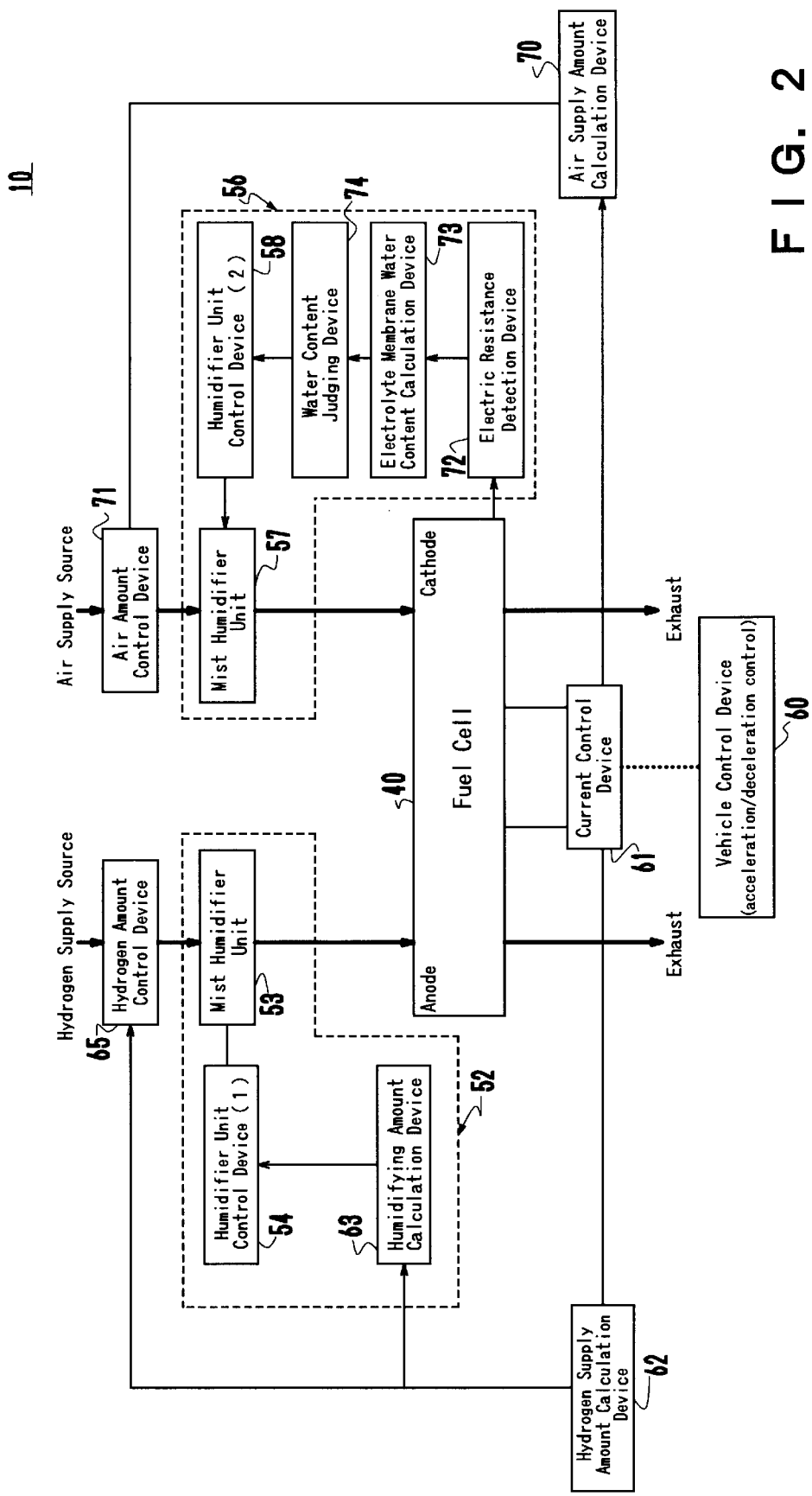
F I G. 2

HUMIDIFER DEVICE FOR FUEL CELLS AND OPERATING SYSTEM THEREOF

BACKGROUND OF THE INVENTION

1. Field of the Invention

The present invention relates to a humidifier device for use in fuel cells and an operating system thereof in entire fuel cell systems. In particular, the present invention relates to a humidifier device for use in fuel cells and a water control device for use in fuel cell systems, which are suitable as a humidifier device and a water control device for humidifying process gases supplied to fuel cells used as onboard power sources or fixed-type small sized electric generators.

2. Description of the Related Arts

Fuel cells are adapted to supply fuels and discharge reaction products continuously and convert chemical energy possessed in fuels directly into electric energy, and have various advantages features such as high energy conversion efficiency, less emission of atmospheric contaminants, low noises and optional choice of scales. The fuel cells are classified in accordance with the kind of electrolytes used into solid polymeric type, phosphate type, alkali type, molten carbonate type and solid oxide type.

Among the fuel cells, solid polymer fuel cells, phosphoric acid fuel cells and alkaline fuel cells generate electromotive force by proton-conducting from an anode to a cathode and it is in common with them that control of a wet state of electrolytes is essential for normal operation of electrolytes.

For example, in a solid polymer fuel cell, a solid polymer electrolyte membrane having a proton conductivity is used as the electrolyte. Specifically, fluoro polymer electrolyte membrane typically represented by a perfluoro sulfonic acid membrane is used generally which is known under the trade name of Nafion (registered trade mark for products manufactured by Du Pont Co.).

The fluoro polymer electrolyte membrane is excellent in oxidation resistance and show good proton conductivity in a wet state but the electric resistance is increased as the water content lowers and can no longer function as the electrolyte membrane. Accordingly, the fluoro polymer electrolyte membrane is usually used in a saturated wet state.

However, since the operation temperature of a solid polymer fuel cell is about 80° C., water evaporates from the electrolyte membrane during operation of the fuel cell, and water content in the electrolyte membrane lowers gradually. Further, when proton-conducting from the anode to the cathode, since molecules of water transfer simultaneously, the area for the anode tends to be drying-out particularly. If the situation is left as it is, the electric resistance of the electrolyte membrane increases to generate heat, which lowers the electric power or causes failure.

In view of the above, in the solid polymer fuel cell, process gases supplied to a gas diffusion electrode is generally humidified for properly controlling the wet state of the electrolyte membrane for operating the electrolyte normally.

Further, a phosphoric acid fuel cell uses as an electrolyte, a concentrated aqueous solution of phosphoric acid impregnated in an SiC matrix and the operation temperature is about 200° C. Further, an alkaline fuel cell includes a matrix type and a free electrolyte type, in which the matrix type is a fuel cell using, as an electrolyte, an aqueous solution of potassium hydroxide at a concentration of 30 to 45% impregnated into asbestos and operated at a temperature of about 100° C.

Also in the phosphoric acid fuel cell and the alkaline fuel cell, it is necessary to properly control the wet state of the electrolyte membrane in order to operate the electrolyte normally and process gases are humidified if the output voltage is lowered or temperature elevation occurs in the fuel cell.

As a humidifier device for humidifying process gases supplied to fuel cells, a humidifier device using steams for humidification and a humidifier device using mists for humidification are known. In the humidifier device using steams, process gases are passed in a humidifying tank (so-called bubbling tank) kept at a high temperature for humidification corresponding to saturated steam pressure, which has a merit capable of stable humidification.

In the humidifier device using mists, finely atomized mists are added to process gases. For example, Japanese Published Unexamined Patent Application Hei 5-54900 discloses a solid polymer fuel cell having a humidifier device for process gases of adding mists finely atomized to 300 $\mu$m or less to at least one of fuels or oxidants by using a mist atomizer having a spray nozzle or an ultrasound atomizer apparatus.

In the humidifier device using mists, since sprayed mists are transferred as they are to the electrode on the process gases as a carrier, it provides a merit capable of quantitatively controlling the amount of humidifying water. Further, since the process gases are deprived of latent heat of evaporation when the mists atomize into steams, it has a merit capable of expecting a cooling effect for the process gases.

However, since the humidifier device of humidifying process gases by steams consumes a great amount of energy for generating steams, which causes lowering of energy conversion efficiency of the fuel cell. In addition, since it is necessary to keep the water source at a high temperature to always generate steams during operation of a fuel cell, heating is necessary also for unconsumed water content to further increase the energy loss.

Further, for always generating steams a bubbling bath of a large capacity is required and since a bubbling bath of a large capacity has a large heat capacity, a time constant regarding the change of temperature is increased. Therefore, it requires a long time for elevating the temperature of the bubbling bath and water to a predetermined level to bring about a problem in view of the starting property.

Further, since the time constant relative to the change in temperature is large, the response characteristic is poor, which leads to difficulty in transient control. That is, if a load changes abruptly to require a large amount of process gases and, correspondingly, a great amount of steams, since the amount of humidification cannot be increased abruptly, the water content in the electrolyte membrane becomes insufficient to lower the output.

On the other hand, if an excessive amount of steams is sent to the electrode, so-called flooding in which a gas flow channel is closed by liquid water is caused to lower the output and make the operation state of the fuel cell instable. Particularly, since water is produced by electrode reactions on the cathode, flooding is liable to be caused.

On the contrary, the humidifier device for humidifying process gases by mists as disclosed in Japanese Published Unexamined Patent Application Hei 5-54900 consumes less electric power for the spray nozzle or ultrasound atomizer apparatus and, accordingly, it is efficient. Further, since it is not necessary to wait for the elevation of water temperature for atomizing water, there is no problem for the starting property. Further, since the increase/decrease for the amount of humidification can be controlled irrespective of the water temperature, it is highly responsive.

However, even in a case of a mist humidifier using a spray nozzle or ultrasound atomizer apparatus, it is necessary to change the addition amount of the mists to the process gases continuously corresponding to the change of load for stable operation of the fuel cell. However, Japanese Published Unexamined Patent Application Hei 5-54900 describes only for the control corresponding to the output power but discloses nothing at all for concrete means of continuously changing the addition amount of mists in accordance with change of load.

Further, the spray nozzle or the ultrasound atomizer apparatus has only a small control range for the performance of supplying mists and cannot change the addition amount of mists greatly. For example, in a case of atomizing mists by using a spray nozzle, the addition amount of mists to the process gases can be controlled by a primary air flow rate.

However, a minimum flow rate is present in the primary air flow rate and, if the primary air flow rate is excessively low, the diameter of the mists is excessively large to wet the electrode or drip water from the outlet of the nozzle making it difficult to atomize water.

Further, in a method of obtaining mists by using an ultrasound atomizer apparatus, since the minimum voltage for releasing mists is nearly about 80% of the full voltage, a limit is imposed on great change for the mist supplying amount corresponding to the continuously changing load by merely controlling the input voltage to the ultrasound atomizer apparatus.

Further, when methanol reformate gas is used for the fuel gas, reforming reaction is usually conducted at a high S/C ratio condition (mol number of steams charged/mol number of carbons in charged fuel) in order to reduce carbon monoxide as a catalyst poisoning for the electrode catalyst and, as a result, a great amount of steams are contained in the reformate gases.

However, the S/C ratio is sometimes lowered intentionally, for example, in a case of abruptly increasing the amount of fuel supplied in order to increase the power and, in this case, the amount of steams contained in the reformate gases is decreased. Accordingly, mere determination for the amount of humidification on the side of the anode in proportion with the output power may cause insufficiency or excess for the amount of humidification on the side of the anode, failing to conduct effective water control for the electrolyte.

SUMMARY OF THE INVENTION

The present invention has been made in view of the above circumstances and has an object to overcome the above problems and to provide a humidifier device for use in fuel cells which is used for fuel cells requiring control for the wet state of an electrolyte membrane, capable of humidifying process gases with no excess or insufficiency corresponding to load-change, without lowering the energy conversion efficiency, response performance and starting performance to thereby capable of outstandingly improving the operation stability of the fuel cell.

Further, another object of the present invention is to provide a water control device for use in fuel cell systems which is used for a fuel cell using reformate gases as a fuel and capable of humidifying fuel gases with no excess or insufficiency even if S/C ratio in reforming reaction changes, thereby capable of outstandingly improving the operation stability of the fuel cell.

Additional objects and advantages of the invention will set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the present invention, as embodied and broadly described herein, a humidifier device for use in fuel cells according to the present invention has a feature in comprising a mist humidifier unit for atomizing water into process gases supplied to an electrolyte membrane equipped in a fuel cell and a control device for the humidifier unit for intermittently operating the mist humidifier unit in accordance with the operating condition of the fuel cell.

In the humidifier device for use in fuel cells having the constitutions described above according to the present invention, since the mist humidifier unit is intermittently controlled by the control device for the humidifier unit, the amount of the mists added to the process gases can be changed continuously and greatly even when a mist humidifier unit of a performance with narrow control range for the supply of the mists is used.

Accordingly, even if the operating condition of a fuel cell changes depending on the load-change or the like, process gases can be humidified appropriately with no excess or insufficiency and the operation stability of the fuel cell can be improved outstandingly.

Furthermore, since humidification to the process gases are conducted by using mists atomized from the mist humidifier unit, the energy loss is reduced and starting performance and response performance can be improved compared with the steam humidification by using bubbling bath. Further, the consumption power of the mist humidifier unit can be lowered by intermittently operating the mist humidifier unit.

Further, the water control device for use in fuel cell system according to the present invention has a feature in the provision of a mist humidifier unit for adding mists to process gases supplied to an electrolyte membrane equipped in a fuel cell, a water supply unit for supplying water as a reforming material to a fuel reforming device for forming process gases, and the water control device for making a balance between the amount of water added to the process gases by way of the mist humidifier unit and the amount of water supplied by way of the water supply unit to the fuel reforming device in accordance with the operating condition and the control characteristics of the fuel cell.

In the water control device for use in fuel cell systems having the foregoing constitutions according to the present invention, water as the reforming material is at first supplied by way of the water supply unit to the fuel reforming device, and fuel gases incorporated with steams according to the S/C ratio of reforming material are formed in the fuel reforming device. Further, mists from the mist humidifier unit are added to the fuel gases supplied from the fuel reforming device and supplied to the electrolyte membrane equipped in the fuel cell.

In this case, depending on the operating condition of the fuel cell such as load-change and operating condition of the fuel cell system such as change of the S/C ratio in the reforming material, the amount of water supplied to the water supply unit and the amount of water added from the mist humidifier unit to fuel gases are controlled by the water control device such that the total amount of humidification to the process gases takes a predetermined value.

This can humidify the process gases with no excess or insufficiency even if the operating condition of the fuel cell such as load are changed, as well as control characteristics of the fuel cell system such as change of the S/C ratio in reforming material are changed, so that operation stability of the fuel cell system can be improved outstandingly.

According to the present invention, since the mist humidifier unit for atomizing water into process gases supplied to the electrolyte membrane equipped in the fuel cell and the water control device for the humidifier unit for intermittently operating the mist humidifier unit based on the operating condition of the fuel cell are provided, it can provide advantageous effects of reduced energy loss, excellent response performance and improved starting performance.

Further, since the mist humidifier unit is intermittently controlled in accordance with the operating condition of the fuel cell, it can provide an advantageous effect capable of humidifying process gases with no excess or insufficiency even if the load changes greatly.

Further, since the water control device for use in fuel cell system according to the present invention comprises a control device for making a balance between the amount of water supplied from the water supply unit to a reformer system and the amount of water added to process gases from the mist humidifier unit is controlled in accordance with the change of the S/C ratio, when the present invention is applied to a fuel cell of using a steam reforming system for methanol as a fuel supply system, it can provide an advantageous effect capable of humidifying the fuel gases with no excess or insufficiency even if the S/C ratio in the reforming reaction changes abruptly.

Still further, the fuel cell operating system according to the present invention has a feature in the provision of fuel gas supply means for supplying fuel gases to an anode of a fuel cell, oxidizing gas supply means for supplying oxidizing gases (for example, air) to a cathode of the fuel cell, first mist adding means for adding mists to the fuel gases supplied to the anode by the fuel gas supply means, second mist adding means for adding mists to the oxidizing gas supplied to the cathode by the oxidizing gas supply means, first control means for variably controlling an amount of the mists added to the fuel gases by the first mist adding means in accordance with operating condition of the anode and a second control means for variably controlling an amount of the water added to the oxidizing gases by the second mist adding means in accordance with the operating condition of the fuel cell.

As described above, in the humidifier device for use in fuel cells, the water control device for use in fuel cell system and the fuel cell operating system according to the present invention, since the operation stability of the fuel cell system can be improved outstandingly without deteriorating the energy conversion efficiency, starting performance and response performance, for example, if it is applied to a fuel cell system for use in onboard power source, it contributes to the improvement of the drivability and the fuel consumption in automobiles and eventually it serves to great industrial progress.

BRIEF DESCRIPTION OF THE DRAWINGS

FIG. 1 is a constitutional view for a fuel cell system to which the present invention is applied;

FIG. 2 is a block diagram for a fuel cell system having a humidifier device according to the present invention.

DETAILED DESCRIPTION OF THE PREFERRED EMBODIMENTS

Figure 3:
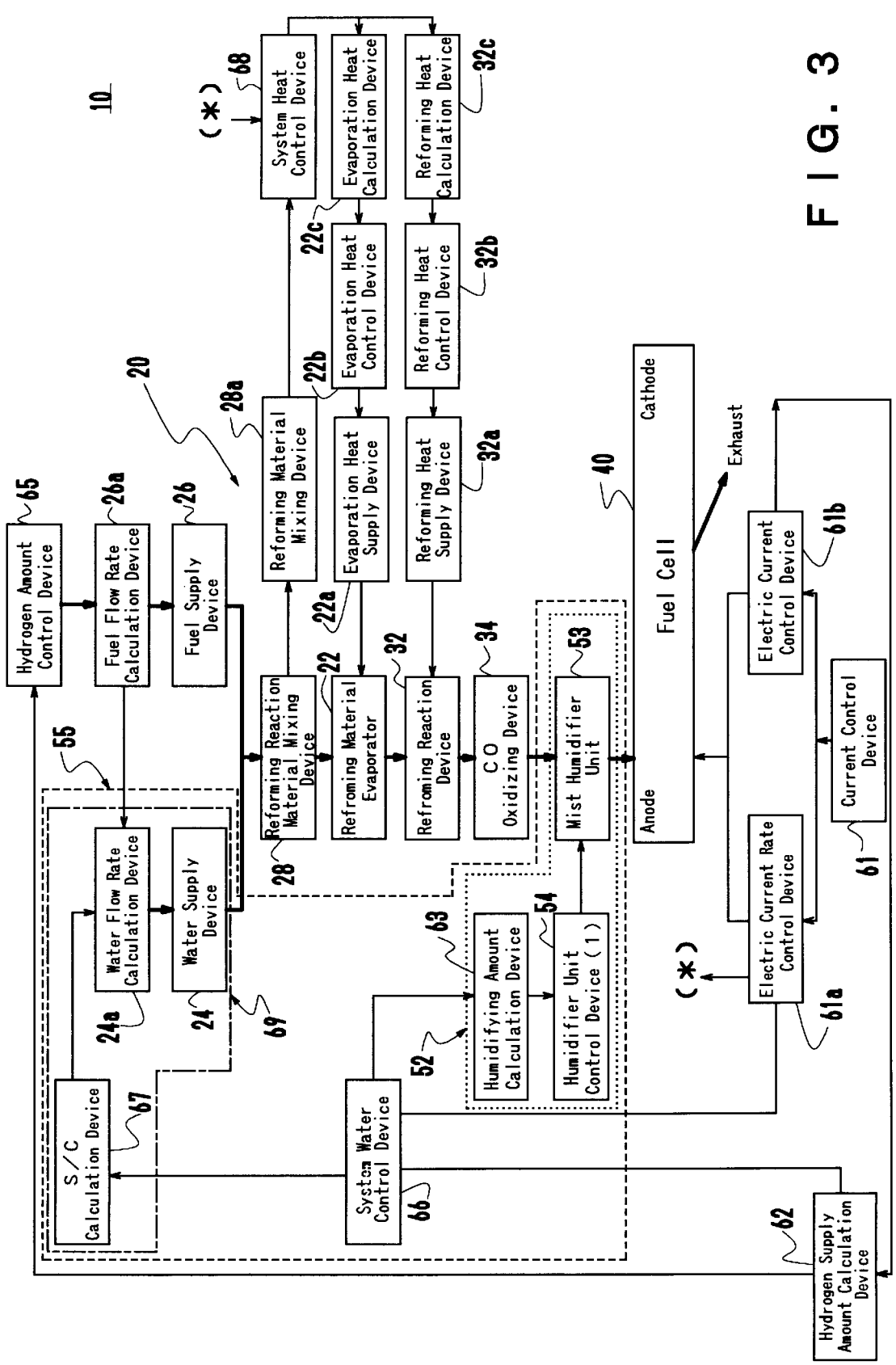
FIG. 3 is a block diagram for a fuel cell system having a water control device for a fuel cell system according to the present invention.

The present invention is to be explained in details by way of preferred embodiments with reference to the drawings. The present invention is directed to all sorts of fuel cells requiring control for the wet state of electrolyte membrane. Further, the present invention has application uses including, for example, an onboard power source or a fixed type small-sized electric generator, but it is not restricted thereto. Explanation is to be made hereinafter for an example of applying the present invention to a solid polymer fuel cell for use in onboard power source.

FIG. 1 is a constitutional view showing an example of a fuel cell system to which the present invention is applied. In FIG. 1, a fuel cell system 10 comprises a reformer system 20, a solid polymer fuel cell (hereinafter simply referred to as "fuel cell") 40 and humidifier devices 52 and 56.

The reformer system 20 is adapted to supply fuel reforming gas as a fuel to the fuel cell 40 (for example, methanol) and comprises a reforming material evaporator 22, a reforming heat supply device 32a, a reforming reaction device 32 and a CO oxidizing device 34.

The reforming material evaporator 22 is a section for heating to evaporate water and methanol as the materials for reforming reaction, in which an evaporation heat supply device (not illustrated) for supplying heat of evaporation to the materials for reforming reaction is disposed. Water and methanol supplied from a water supply device 24 and a fuel supply device 26 as the materials for reforming reaction are mixed in a reforming reaction material mixing device 28 for materials for reforming reaction and then supplied to the reforming material evaporator 22.

Further, a reforming heat supply device 32a is disposed at the exit of the reforming material evaporator 22 to superheat fuel vapors and steams for reforming reaction discharged from the reforming material evaporator 22 to a temperature of several hundred degrees (° C.). The materials for reforming reaction are superheated to several hundred degrees (° C.), because the steam reforming reaction is an endothermic reaction as is well-known and it is necessary to supply heat required for the reforming reaction from the outside.

The reforming reaction device 32 is a section for reacting methanol vapors and steams supplied by way of the reforming material evaporator 22 and the reforming heat supply device 32a under the presence of a catalyst to form reformate gases containing hydrogen as a main ingredient. A $CuO$—$ZnO$ series catalyst is generally used as the reforming catalyst.

The CO oxidizing device 34 is a section for selective oxidized reaction of a slight amount of carbon monoxide contained in the reformate gases generated by the reforming reaction device 32 thereby lowering the content of carbon monoxide in the reformate gases to several tens ppm or lower. An air supply device 36 is connected to the CO oxidizing device 34 to supply air required for selective oxidizing reaction to the CO oxidizing device 34.

Further, since the oxidizing reaction for carbon monoxide is an exothermic reaction, a cooling device 34a is disposed to the CO oxidizing device 34 to keep the CO oxidizing device 34 always at a predetermined temperature.

The fuel cell 40 comprises electrode-electrolyte assemblies 42 each having gas diffusion electrodes joined on both surfaces of a solid polymeric electrolyte membrane, and current collectors 44 having a gas flow channel for supplying process gases, in which both surfaces of the electrode-electrolyte assembly 42 are put between current collectors 44 to form a unitary cell and several hundreds of such unitary cells are laminated in series. A precious metal electrode catalyst (such as platinum) is used for the gas diffusion electrode.

The fuel cell 40 is connected by way of a humidifier device 52 to the reformer system 20, so that reformate gases converted in the reformer system 20 are supplied to one of the gas diffusion electrodes (hereinafter referred to as "anode"). A back pressure control valve 46 and a burner are connected to the discharging side of the anode.

Further, the fuel cell 40 is connected by way of the humidifier device 56 to an air supply device 48, such that air is supplied to the other of the gas diffusion electrodes (hereinafter referred to as "cathode"). Further, a back pressure control valve 50 and an exhaust duct are connected to the exhaust side of the cathode.

The humidifier devices 52, 56 have mist humidifier units 53, 57 and humidifier unit control devices 54, 58 respectively. Further, each of the humidifier devices 52 and 56 is provided with a bubbling bath for storing humidifying water, various detectors for detecting the operating condition of the fuel cell, and calculating the amount of water added to the process gases from the mist humidifier units 53, 57 and control equipment although not illustrated.

Each of the mist humidifier units 53 and 57 has an atomizer apparatus (not illustrated), so as to add a predetermined amount of water to the reformate gases and air supplied to the fuel cell 40. In this embodiment, an ultrasound atomizer apparatus or a spray nozzle is used as an atomizer.

The ultrasound atomizer apparatus or the spray nozzle is particularly suitable as an atomizer since it can easily form mists having a diameter of about 1 to 30 μm, can easily conduct ON-OFF control for the mist atomizing and has no requirement of keeping the water source always to a high temperature but the energy supplied can be utilized directly for humidification.

Further, in this embodiment, the mist humidifier unit 53 on the side of the anode is provided with a plurality of mist atomizers 53a, 53b and 53c. In the fuel cell system for use in an onboard power source, a large load-change occurs during driving. However, since the ultrasound atomizer apparatus or the spray nozzle has a narrow control range for the performance of supplying mists (hereinafter referred to as "operation performance"), humidification depending on the load-change may sometimes be difficult by using only a single mist atomizer.

On the other hand, when a plurality of mist atomizers are disposed to the mist humidifier unit 53, since the amount of humidification to the process gases can be changed greatly and continuously even if the large load-change occurs, it can provide an advantage capable of operating the fuel cell 40 stably.

On the other hand, a single mist atomizer 57a having a sufficient operating performance is disposed for the mist humidifier unit 57 on the side of the cathode. Since water produced by electrode reactions and water transferred together with protons from the anode are present in the area of the cathode, humidification is usually unnecessary on the side of the cathode, and the fuel cell 40 can be operated stably even without applying strict humidifying control according to the load-change.

The number of the mist atomizers disposed to the mist humidifier unit 53 on the side of the anode may be determined taking the operation performance of the mist atomizer and the maximum power of the fuel cell 40 into consideration. Alternatively, in a case of a fuel cell system 10 in application uses with no large load-change, a single mist atomizer having a sufficient operation performance may be disposed to the mist humidifier unit 53 on the side of the anode. Further, a plurality of mist atomizers may be disposed to the mist humidifier unit 57 on the side of the cathode for finely controlling the amount of humidification in accordance with the operation state of the fuel cell 40.

The humidifier unit control devices 54, 58 are adapted to intermittently control the mist humidifier units 53, 57, in which electric current of the fuel cell is detected by using various kinds of detectors, and the number of mist atomizers to be operated, the operating performance and the duty ratio of each of the mist atomizers equipped in a mist humidifier units 53, 57 are controlled using the detected amount of electric current as control parameters.

Further, a water supply control device 59 which controls the water supply device 24 and the humidifier unit control device 54 which controls the mist humidifier unit 53 are connected by way of an entire water control device 75. The entire water control device 75 send command signals to the water supply control device 59 and the humidifier unit control device 54. Based on the command signals, a balance is made between the amount of water supplied to the water supply device 24 and the amount of water added from the mist humidifier unit 53 to the reform fuel gas. A main portion of the water control device for use in fuel cell systems comprises these control devices 54, 59 and 75, the humidifier device 52 having the mist humidifier unit 53 and the water supply device 24.

Besides the forgoing water control to the reformate gas on the side of the anode, total amount of humidification on both sides of the anode and the cathode can be controlled.

In this case, the water supply control device 59 which controls the water supply device 24, the humidifier unit control device 54 which controls the mist humidifier unit 53, and the humidifier unit control device 58 which controls the mist humidifier unit 57 are connected by way of an entire water control device 75. The entire water control device 75 sends command signals to the water supply control device 59, the humidifier unit control device 54, and the humidifier unit control device 58. Based on the command signals, the entire water control device 75 serves to keep a balance between the amount of water supplied to the water supply device 24, the amount of water added from the mist humidifier unit 53 to the fuel gas, and the amount of water added from the mist humidifier unit 57 to the air supplied to the fuel cell 40. A main portion of the water control device for use in fuel cell systems comprises these control devices 54, 59 and 75, the humidifier devices 52 and 56 having the mist humidifier units 53 and 57 and the water supply device 24.

In the latter case in which the total amount of humidification on both sides of the anode and the cathode is integrally brought under control, humidification distribution rate between the sides of the anode and the cathode can be changed in accordance with a balance between back refusion resulted from change in thickness of the electrolyte membrane and proton-conducting. Specifically, when the electrolyte membrane is reduced in thickness to increase the rate of back refusion, it would be possible to control humidification on the side of the cathode through mere control on the side of the anode.

Then, explanation is to be made for the operation of the fuel cell system 10 shown in FIG. 1. At first, water and fuel supplied from the water supply device 24 and the fuel supply device 26 are mixed into materials for reforming reaction in the reforming reaction material mixing device 28 and they are supplied to the reforming material evaporator 22.

The reforming material evaporator 22 gives heat of evaporation to the materials for reforming reaction using an evaporation heat supply device not illustrated to form a gas mixture of methanol vapors and steams. The gas mixture thus generated is heated to a temperature of several hundred degrees (° C.) by the reforming heat supply device 32a and then sent to the reforming reaction device 32. In the reforming reaction device 32, the reforming reaction shown by the following formula (1) is taken place to convert reformate gases as is well known.

$$CH_3OH+(S/C)H_2O \rightarrow 3H_2+CO_2+(S/C-1)H_2O \qquad (1)$$

in which "S/C" is a ratio of the mol number of charged steams relative to the mol number of carbons in the charged fuel, namely, the S/C ratio. Generally, as the S/C ratio increases, the thermal load increases but the content of carbon monoxide in the reformate gases tends to decrease. Therefore, the reforming reaction is conducted usually under the condition at a high S/C ratio.

Since carbon monoxide formed by shift reaction is contained by several % in the reformate gases obtained in the reforming reaction device 32, carbon monoxide in the reformate gases are then selectively oxidized in the CO oxidizing device 34.

Selective oxidized reaction of the carbon monoxide is conducted by supplying air corresponding to the amount of oxygen twice as much as the amount of carbon monoxide in the reformate gases from the air supply device 36, and oxidizing to remove carbon monoxide while keeping the CO oxidizing device 34 to a constant temperature by the cooling device 34a. Thus, the amount of carbon monoxide in the reformate gases is decreased to several tens ppm or lower.

Then, the thus obtained reformate gases are sent to the mist humidifier unit 53 of the humidifier device 52. In the mist humidifier unit 53, water supplied from a humidifying tank not illustrated is atomized by the mist atomizer and added to the reformate gases. The amount of humidification on the side of the anode is controlled by intermittently controlling the number of atomizers to be operated, the operating performance and the duty ratio of a plurality of mist atomizers by using the humidifier unit control device 54.

In the same way, air supplied from the air supply device 48 is sent to the mist humidifier unit 57 of the humidifier device 56. In the mist humidifier unit 57, water supplied from a humidifying tank not illustrated is formed into mists by the mist atomizer and added to air. The amount of humidification on the side of the cathode is controlled by intermittently controlling the operation performance and the duty ratio of the mist atomizer by using the humidifier unit control device 58.

When the reformate gases and air to which a predetermined amount of water is added are supplied to the fuel cell 40, protons produced on the anode transfer to the cathode and react with oxygen on the cathode to produce water. Further, a potential difference is generated by proton-conducting to the cathode and the generated potential difference is taken out by way of the current collectors 44 as an electric power to the outside.

Further, the mists added to the process gases are converted into steams directly or by absorption of heat inside the cell and reach the electrode-electrolyte assembly 42. Further, water reaching the electrode-electrolyte assembly 42 passes through the gas diffusion electrode and is absorbed in the electrolyte membrane. Thus, the water content in the electrolyte membrane is maintained to a predetermined value.

Gases discharged from the anode are sent to the burner after lowering the pressure by the back pressure control valve 46 and hydrogen remaining in the exhaust gases are removed by combustion. Gases discharged from the cathode are discharged from an exhaust duct also after lowering the pressure by the back pressure control valve 50. Then, the procedures described above are repeated till the fuel cell 40 stops.

In the fuel cell system 10 shown in FIG. 1, the humidifier device 52 on the side of the anode is disposed between the CO oxidizing device 34 and the fuel cell 40. Alternatively, the humidifier device 52 on the side of the anode may also be disposed between the reforming reaction device 32 and the CO oxidizing device 34.

When the mist humidifier unit 53 on the side of the anode is disposed between the reforming reaction device 32 and the CO oxidizing device 34, the reformate gases supplied from the reforming reaction device 32 are cooled by the addition of the mists and cooled reformate gases are supplied to the CO oxidizing device 34. Therefore, this provides a merit of reducing the thermal load on the cooling device 34a and improving the energy conversion efficiency.

The method of controlling the amount of humidification of the humidifier devices 52, 56 is to be explained. The control for the amount of humidification in the present invention is basically conducted by the intermittent control of repeating ON/OFF control for the mist atomizer equipped in the mist humidifier units 53, 57 at a predetermined cycle.

Since the purpose of humidification is different between the anode and the cathode, the amount of humidification on the side of the anode and that on the side of the cathode are determined individually. This is different from humidification of the prior art in which the amount of humidification to the reformate gases and that to the air was made identical and only the total amount of humidification to the reformate gases and the air is controlled.

At first, a method of controlling the humidifier device 52 on the side of the anode is to be explained. During operation of the fuel cell 40, protons conduct from the anode to the cathode, while water molecules transfer simultaneously toward the cathode, so that the water content tends to be insufficient, particularly, on the side of the anode. Humidification on the side of the anode is conducted with an aim of supplementing insufficiency of the water content by proton-conducting.

Since the transfer amount of water molecules is in proportion with the amount of proton-conducting, namely, the amount of electric current, if the fuel cell 40 is operated in a high current density region at a constant amount of humidification, the amount of water supplied to the anode becomes relatively insufficient.

If the amount of water supplied to the anode becomes insufficient, it results in insufficiency for the water content in the electrolyte membrane, to increase the electric resistance of the electrolyte membrane and lower the voltage. If the water content is further insufficient, it causes cell failure.

Further, in a fuel cell system 10 in which a fuel cell 40 is combined with a reformer system 20, reforming reaction is usually taken place at a high S/C ratio condition capable of stably obtaining reformate gases at low carbon monoxide content. However, upon transient reforming reaction in which abrupt increase is intended for the amount of fuel supply, for example, in order to increase the electric power, the S/C ratio is sometimes lowered intentionally in order to lower the water thermal capacity in the materials for reforming reaction.

When a great amount of materials for reforming reaction are supplied to the reforming reaction device while keeping S/C at a high ratio upon transient reforming reaction, the heat quantity is insufficient and the materials for reforming reaction cannot be superheated to a temperature suitable to the reforming reaction.

However, when the S/C ratio in the reforming reaction is lowered, the amount of steams contained in the reformate gases is also reduced simultaneously as shown in the formula (1) above. Therefore, when the amount of humidification with the mists is controlled only based on the electric current, the total amount of humidification supplied to the anode becomes insufficient to lower the voltage or cause cell failure.

Accordingly, it is important to control the amount of humidification in accordance with the operating condition, particularly, the amount of electric current of the fuel cell 40 and the amount of water appropriately with no excess or insufficiency on the side of the anode. Further, when the fuel cell 40 is combined with the reformer system 20, it is important to control the amount of humidification in accordance with the S/C ratio for the reforming reaction in addition to the electric current.

In view of the above, in this embodiment, a plurality of mist atomizers are provided in the mist humidifier unit 53 on the side of the anode such that the amount of humidification can be increased or decreased continuously and greatly in accordance with the change of load or change of the S/C ratio. Further, control for the amount of humidification is conducted by controlling the number of mist atomizers to be operated, the operating performance and the duty ratio for each of the mist atomizers.

For example, when the duty ratio for each of the mist atomizers is controlled individually while keeping the number of mist atomizers to be operated and the operating performance of the mist atomizers constant, each of the mist atomizers merely repeats the operation state (ON) and stationary state (OFF) intermittently, but the amount of humidification increases as the number of the mist atomizers with high duty ratio increases. Accordingly, the amount of humidification for the entire system can be changed continuously by merely operating the mist atomizers of different duty ratios intermittently.

Further, in addition to the control of the duty ratio, if the number of the mist atomizers to be operated and the operating performance thereof are changed in accordance with the operating situation of the fuel cell, the amount of humidification to the reformate gases can be changed continuously and greatly even if mist atomizers with a narrow control range for the operating performance are used. This enables to operate the fuel cell system stably even if it undergoes large load-change as in a fuel cell system for use in an onboard power source.

Further, the water control device for use in fuel cell systems according to the present invention comprises a control device for making a balance between the amount of water supplied from the water supply device 24 to the reformer system 20 and the amount of water added from the mist humidifier unit 53 to the process gases. Therefore, even if the S/C ratio changes in the fuel cell system 10 combined with the reformer system 20, mists can be added appropriate with no excess or insufficiency corresponding to the change of the S/C ratio by controlling the number of mist atomizers to be operated and the operating performance and the duty ratio for each of the mist atomizers individually, and the fuel cell system 10 can be operated stably.

In this case, as the parameters for deciding the amount of the humidification on the side of the fuel cell depending on the load-change, electric current, the amount of hydrogen consumed, the amount of hydrogen supplied and the like can be used. Specifically, the amount of humidification with mists may be controlled in accordance with the amount of hydrogen consumed as the parameter while taking the proton-conducting and back refusion into consideration.

Further, if the S/C ratio changes, the total amount of humidification to the reformate gases is calculated in water supply control device for use in fuel cell systems by using the amount of electric current, the amount of hydrogen consumed or the amount of hydrogen supplied as the parameters and, further, the distribution ratio of the amount of humidification may be determined such that the sum of the amount of steams formed by the reforming reaction and the amount of humidification with mists is equal with the total amount of humidification by using the current rate and the electric current (amount of hydrogen supplied).

Generally, it is preferred that the S/C ratio is decreased to increase the amount of humidification with mists as the current rate increases. Since the heat capacity of the materials for reforming reaction is decreased as the S/C ratio is lowered, the temperature elevation time for the materials for reforming reaction can be shortened even if the temperature in the reforming material evaporator 22 is low. Therefore, even when the load changes abruptly, a great amount of fuels can be supplied rapidly to operate the fuel cell 40 stably.

Further, it is preferred to lower the S/C ratio and increase the amount of humidification with mists as the electric current increases. Since the heat capacity of the materials for reforming reaction is decreased by lowering the S/C ratio, the amount of supplying the material for reforming reaction can be increased even if the thermal load is identical.

Therefore, even if there is a restriction on the evaporation performance of the evaporation heat supply device equipped in the reforming material evaporator 22, a great amount of materials for reforming reaction can be supplied to the reforming reaction device 32 and the fuel cell 40 can be operated stably in a high current density region.

In a case of a fuel cell system 10 for an application use with no large load-change, the amount of humidification can be increased or decreased by continuously operating each of the mist atomizers of the mist humidifier unit 53 on the side of the anode, while controlling only the number of mist atomizers to be operated and/or operating performance thereof.

Then, explanation is to be made to a method of controlling the humidifier device 56 on the side of the cathode. Humidification on the side of the cathode is conducted with an aim of rapidly humidifying the electrolyte membrane in a drying-out state upon starting to assist smooth proton-conducting. This is because the electrolyte membrane is usually in a drying-out state when the fuel cell 40 is not in operation and, if the electrolyte membrane is in a drying-out state, the fuel cell 40 is not started stably.

Further, during stable operation, since water is produced by the electrode reactions on the side of the cathode, humidification is not necessary. Rather, if humidification is applied on the side of the cathode in a high current density state or in a state of insufficient gas supply, flooding may occur depending on the balance of the product-water, the humidifying water supplied and the discharging water with gas flow. The flooding is a phenomenon that liquid water transported in the flow channel causes gas blocking and, since gas blocking occurs to a portion of a laminated stack, it causes local reduction of the electric power.

On the other hand, in a high current density state or in a state of insufficient gas supply, the area on the side of the cathodes tends to be drying-out due to internal heat of reaction (electric power generation loss). If no appropriate countermeasure is taken in such a case, this brings about increase of the electric resistance and voltage drop, which further leads to cell failure.

Accordingly, it is important, on the side of the cathode, to supply a great amount of humidifying water upon starting to ensure the wet state of the electrolyte membrane in a short time. Further, for suppressing the flooding, it is important not to apply humidification on the side of the cathode and promote evaporation and removal of water present on the side of the cathode during stable operation. Further, in a drying-out state of the electrode, it is important to supply an appropriate humidification on the side of the cathode.

In view of the above, in this embodiment, a single mist atomizer having a sufficient operating performance is equipped in the mist humidifier unit 57 on the side of the cathode such that an effective humidification if required can be supplied rapidly. Further, the amount of humidification is controlled by controlling the operating performance and the duty ratio of the mist atomizer.

That is, since the electrolyte membrane is in a drying-out state upon starting, a great amount of humidifying water is supplied to the electrolyte membrane in a short time, by operating the mist atomizer continuously, or operating it at a high duty ratio and with high operating performance simultaneously with starting. This can eliminate the drying-out state of the electrolyte membrane in a short time upon starting to improve the starting performance of the fuel cell 40.

During operation of the fuel cell 40, since water is produced by electrode reactions and humidification is not required, the mist atomizer is stopped. Further, the mist atomizer may be operated only in a case where the area of the cathode tends to be drying-out such as in a state of high current density and the amount of humidification may be increased or decreased by controlling the duty ratio and the operating performance.

This can promote evaporation and removal of water in a cathode flow channel to prevent flooding phenomena during stable operation. Further, this can suppress the voltage drop caused by drying-out of the electrolyte membrane in a high current density state or in a state of insufficient gas supply and can operate the fuel cell system stably.

In this case, as the parameter for deciding the amount of humidification on the side of the cathode, water content in the electrolyte membrane may be used preferably. The water content is calculated by using a cell electric resistance, operating temperature, electric current and the like. Then, if the water content in the electrolyte membrane is decreased to lower than a "threshold water content", the mist atomizer is operated and, on the other hand, the mist atomizer is stopped if the water content exceeds the "threshold water content". Further, it is preferred to increase the duty ratio and/or to improve operating performance to increase the amount of humidification per unit time as the difference between the water content of electrolyte membrane and the threshold water content increases.

As described above, the starting performance and the operation stability of the fuel cell can be improved by separately controlling the amount of humidification on the side of the anode and the amount of humidification on the side of the cathode side and by intermittently operating the mist humidifier units 52 and 56.

Further, since the mist atomizers have only to be operated only when the humidification is necessary both for the sides of the anode and the cathode, the total operation time for the mist humidifier units 53 and 57 can be shortened to reduce the electric power consumed.

Further, since the amount of humidification can be changed greatly by intermittently operating the mist humidifier units 52 and 56, it is not necessary to make the amount of humidification excessive in expectation of a safety factor. Therefore, the amount of humidifying water reserved can be minimized to reduce the total capacity of the fuel cell system 10.

Then, explanation is to be made for a concrete method of controlling the amount of humidification on the sides of the anode and the cathode in a case of no change of the S/C ratio. FIG. 2 is a block diagram for the constitution of a fuel cell system 10 having humidifier devices 52 and 56 according to the present invention.

In the fuel cell system 10 shown in FIG. 2, a humidifier device 52 on the side of the anode comprises a mist humidifier unit 53, a humidifier unit control device 54 and a humidifying amount calculation device 63. Further, a humidifier device 56 on the side of the cathode comprises a mist humidifier unit 57, a humidifier unit control device 58, an electric resistance detection device 72, an electrolyte membrane water content calculation device 73 and a water content judging device 74.

At first, explanation is to be made for the method of controlling the amount of humidification on the side of the anode. At first in FIG. 2, when acceleration/deceleration control for a vehicle is conducted, a control signal is sent from a vehicle control device 60 to a current control device 61. The current control device 61 calculates, based on the control signal, an electric current to be outputted from the fuel cell 40 (hereinafter referred to as "instructed electric current amount") and outputs the calculated value to the hydrogen supply amount calculation device 62 and an air supply amount calculation device 70.

The hydrogen supply amount calculation device 62 calculates the flow rate of hydrogen required for outputting the instructed electric current (hereinafter referred to as "required hydrogen flow rate") and outputs the calculated required hydrogen flow rate to the humidifying amount calculation device 63 and the hydrogen amount control device 65, respectively.

The hydrogen amount control device 65 controls the flow rate of fuel gases supplied from the hydrogen supply source so as to supply hydrogen corresponding to the required hydrogen flow rate to the mist humidifier unit 53. As the hydrogen supply source, the reformer system 20 shown in FIG. 1, as well as other hydrogen power sources such as a hydrogen reservoir may also be used.

Further, the humidifying amount calculation device 63 calculates the amount of humidifying water in proportion with the amount of hydrogen consumed, based on the required hydrogen flow rate outputted from the hydrogen supply amount calculation device 62, and taking proton-conducting and back refusion into consideration. The calculated amount of humidifying water is outputted to the humidifier unit control device 54 of the humidifier device 52. In a case of using the reformer system 20 as the hydrogen supply source, the S/C ratio in the reforming reaction may preferably be taken into consideration upon calculation of the amount of humidifying water.

The humidifier unit control device 54 determines the number of mist atomizers to be operated, and the operating performance and the duty ratio of the mist atomizers equipped in the mist humidifier unit 53.

The mist humidifier unit 53 operates each of the mist atomizers in accordance with the number of atomizers to be operated, the operating performance and the duty ratio thereof decided by the humidifier unit control device 54 and adds the amount of mists corresponding to the amount of humidifying water to the fuel gases supplied from the hydrogen amount controlling device 65. Then, the fuel gases with addition of the mists are supplied to the side of the anode of the fuel cell 40.

Next, explanation is to be made to the method of controlling the amount of humidification on the side of the anode. In FIG. 2, a control signal is sent from vehicle control device 60 to the current control device 61 and, when an instructed electric current is calculated in the current control device 61, the calculated instructed electric current is outputted to the air supply amount calculation device 70.

The air supply amount of calculation device 70 calculates an air flow rate required for outputting the instructed calculated amount of air (hereinafter referred to as "required air flow rate") and outputs the calculated required air flow rate to the air amount control device 71. The air amount control device 71 controls the amount of air supplied from the air supply source such that air corresponding to the required air flow rate is supplied to the mist humidifier unit 57 of the humidifier device 56.

Separately, the electric resistance detection device 72 detects the cell electric resistance of the fuel cell 40, and outputs the detected cell electric resistance to the electrolyte membrane water content calculation device 73. The electrolyte membrane water content calculation device 73 calculates the water content in the electrolyte membrane by using the detected cell electric resistance, as well as the operation temperature of the fuel cell 40, the electric current and the like.

The water content judging device 74 judges the relation for the level between the water content calculated in the electrolyte membrane water content calculation device 73 and a predetermined "threshold water content". When it is judged that the water content is lower than the threshold water content, since this shows that the electrolyte membrane is in a drying-out state, a humidifying signal ON is outputted to the humidifier unit control device 58.

When the humidifying signal ON is outputted to the humidifier unit control device 58, a control signal is sent from the humidifier unit control device 58 to the mist humidifier unit 57, and the mist humidifier unit 57 is operated at predetermined duty ratio and operating performance. Thus, a predetermined amount of mist is added to air supplied from the air amount control device 71 and it is supplied to the cathode of the fuel cell 40.

On the other hand, when it is judged in the water content judging device 74 that the water content calculated by the electrolyte membrane water content calculation device 73 is higher than the threshold water content, since this shows that the electrolyte membrane is in a wet state, a humidifying signal OFF is outputted to the humidifier unit control device 58.

When the humidifying signal OFF is outputted to the humidifier unit control device 58, a control signal is sent from the humidifier unit control device 58 to the mist humidifier unit 57 to stop the operation of the mist humidifier unit 57. In this case, air supplied from the air amount control device 71 is supplied as it is with no addition of water to the fuel cell 40.

When the fuel gases and air controlled individually for the amount of humidification by the mist humidifier units 53 and 57 are supplied to the fuel cell 40, electrode reactions proceed in the fuel cell 40 in which the operating current and the operating voltage of the fuel cell 40 change.

The operating current and the operating voltage are detected by the current control device 61 and the operating electric current is compared with the instructed electric current sent from the vehicle control device 60. Then, the controls described above are repeated till the operating electric current is equal with the instructed electric current.

As described above, by the method of intermittently operating the mist humidifier units 53, 57, areas for the anode and the cathode can be humidified with no excess or insufficiency even in a case of great load-change and the fuel cell 40 can be operated stably. Further, not only the feedback control but also the feed forward control is effective. This is because a highly wet state can be prepared beforehand for an abrupt increase of load for instance.

Then, explanation is to be made to a concrete method of controlling the amount of humidification on the side of the anode in a case of using a reformer system 20 as a hydrogen supply source and where the S/C ratio changes. FIG. 3 is a block diagram for the constitution of a fuel cell system having a water control device 55 for use in fuel cell system according to the present invention.

In the fuel cell system 10 shown in FIG. 3, a water control device 55 for use in fuel cell systems comprises a humidifier device 52 for the anode and a humidifier device 56 for the cathode (not illustrated in FIG. 3), a water supply unit 69 and a system water control device (control device) 66 for making a balance between the amount of water added from the humidifier device 52 to process gases and the amount of water supplied from the water supply unit 69 to the reformer system 20.

Further, the water supply unit 69 comprises an s/c calculation device 67, a water flow rate calculation device 24a and a water supply device 24. The humidifier device 52 on the side of the anode comprises, like that shown in FIG. 2, a mist humidifier unit 53, a humidifier unit control device 54 and a humidifying amount calculation device 63. The humidifier device on the side of cathode, although not illustrated in FIG. 3, has the same constitution as that of the humidifier device 56 shown in FIG. 2.

At first, when acceleration/deceleration control is conducted to a vehicle in FIG. 3, a control signal is sent from a vehicle control device not illustrated to a current control device 61. The electric current control device 61 outputs control signals to an electric current rate control device 61a and an electric current control device 61b respectively.

The electric current rate control device 61a calculates the current changing rate and outputs the calculated current changing rate to the system water control device 66 and a system heat control device 68 respectively. Further, the electric current control device 61b calculates an instructed electric current to be outputted from the fuel cell 40 and outputs the calculated instructed electric current to a hydrogen supply amount calculation device 62.

The hydrogen supply amount calculation device 62 calculates a required hydrogen flow rate necessary for outputting the instructed electric current and outputs the calculated required hydrogen flow rate to the hydrogen amount control device 65 and the system water control device 66 respectively.

The required hydrogen flow rate outputted to the hydrogen amount control device 65 is sent to a fuel flow rate calculation device 26a and the fuel flow rate calculation device 26a calculates a fuel flow rate for obtaining the required hydrogen flow rate. Then, based on the calculated fuel flow rate, the fuel supply device 26 is controlled and a predetermined amount of fuel is supplied to a reforming material mixing device 28. Further, the calculated fuel flow rate is outputted to a water flow rate calculation device 24a.

Separately, the entire system water control device 66 calculates the total amount of humidification to the fuel gases based on the required hydrogen flow rate outputted from hydrogen supply amount calculation device 62. Further, the entire system water control device 66 distributes the total amount of humidification into the amount of water supplied to be added to the materials for reforming reaction upon reforming reaction (hereinafter referred to as "amount of water added to steam reforming") and the amount of water supplied by mist humidification based on the required hydrogen flow rate and the electric current rate outputted from the electric current rate control device 61a. The thus distributed amount of water added to the steam reforming and the amount of water supplied due to mist humidification are outputted respectively to the S/C calculation device 67 and the humidifying amount calculation device 63 respectively.

The S/C calculation device 67 calculates the S/C ratio for the reforming reaction using the amount of water added for steam reforming distributed by the entire system water control device 66. The calculated S/C ratio is outputted to the water flow rate calculation device 24a.

The water flow rate calculation device 24a calculates the flow rates of supplied water necessary for the reforming reaction based on the SIC ratio calculated by the S/C calculation device 67 and the fuel flow rate calculated by the fuel flow rate calculation device 26a. Then, the water supply device 24 is controlled based on the calculated supply water flow rate and a predetermined amount of water is supplied to the reforming material mixing device 28.

The reforming reaction material mixing device 28 sufficiently mixes water and fuel supplied from the water supply device 24 and the fuel supply device 26 respectively. In this case, the flow rate of the materials for reforming reaction supplied to the reforming reaction material mixing device 28 is detected by the reforming material flow rate detection device 28a, and the detected flow rate is outputted to the system heat control device 68.

The system heat control device 68 calculates the heat capacity of the materials for reforming reaction and the device controlling heat quantity based on the electric current rate calculated by the electric current rate control device 61a and the flow rate of the materials for reforming reaction detected by the reforming material flow rate detection device 28a. The device controlling heat quantity is a heat quantity necessary for maintaining the temperature of the reforming material evaporator 22 and the temperature of the reforming reaction device 32 to an evaporation temperature of the materials for reforming reaction and a reforming reaction temperature respectively. Further, the calculated heat quantity of the materials for reforming reaction and the device controlling heat quantity are outputted to the evaporation heat calculation device 22c and the reforming heat calculation device 32c, respectively.

The evaporation heat calculation device 22c calculates the heat quantity supplied to the reforming material evaporator 22 (hereinafter referred to as "evaporator heat quantity") using the heat capacity of the materials for reforming reaction and the device controlling heat quantity. Then, the evaporation heat supply device 22a is controlled by the evaporation heat control device 22b so as to give the calculated evaporator heat quantity to the reforming material evaporator 22.

For example, upon starting of the cell where the temperature of the reforming material evaporator 22 is lower than the evaporation temperature of the materials for reforming reaction the evaporator heat quantity is defined as the latent heat quantity+sensible heat quantity, or evaporation heat quantity+heat quantity of temperature elevation applied with the device controlling heat quantity of the materials for reforming reaction calculated from the heat capacity of the materials for reforming reaction.

On the contrary, if the temperature of the reforming material evaporator 22 is higher than the evaporation temperature of the materials for reforming reaction, the evaporator heat quantity is decreased by so much as the device controlling heat quantity.

Then, in the reformed material evaporator 22, sufficiently mixed materials for reforming reaction supplied from the reforming reaction material mixing device 28 are evaporated by the input of heat quantity corresponding to the evaporator heat quantity supplied from the evaporation heat supply device 22a, into a gas mixture of fuel vapor and steams. The thus obtained gas mixture is supplied to a reforming reaction device 32.

Further, the reforming heat calculation device 32c calculates heat supplied to the reforming reaction device 32 (hereinafter referred to as "reforming device heat quantity") by using the heat capacity of the materials for reforming reaction and the device controlling heat quantity calculated by the system heat control device 68. Then, the reforming heat supply device 32a is controlled by the reforming heat control device 32b, so that the calculated reforming device heat quantity is given to the reforming reaction device 32.

For example, upon starting of the fuel cell where the temperature of the reforming reaction device 32 is lower than the reforming reaction temperature, the reforming device heat quantity is defined as the heat quantity required for steam reforming reaction calculated from the molar flow rate of the materials for reforming reaction (hereinafter referred to as "steam reforming reaction heat quantity") plus the device controlling heat quantity.

On the contrary, if the temperature of the reforming device 32 is higher than the reforming reaction temperature, the reforming device heat quantity is decreased by so much as the device controlling heat quantity.

Then, in the reforming reaction device 32, a heat quantity corresponding to the reforming device heat quantity is given from the reforming heat supply device 32a to the gas mixture of fuel vapor and steams supplied from the reforming material evaporator 22 to convert reformate gases comprising hydrogen as the main ingredient by the steam reforming reaction shown in the formula (1) above. The reformate gases thus obtained are supplied to the CO oxidizing device 34.

In the CO oxidizing device 34, a small amount of air is introduced from an air supply device not illustrated in the drawing into the reformate gases supplied from the reforming reaction device 32 and carbon monoxide contained in the reformate gases is selectively oxidized. This can lower the content of carbon monoxide in the reformate gases to several tens of ppm or lower. The reformate gases thus obtained at low CO content are sent to the mist humidifier unit 53 of the humidifier device 52.

On the other hand, the humidifying amount calculation device 63 calculates the amount of humidifying water with mists based on the amount of water supply by mist humidification distributed by the entire system water control device 66. The thus calculated amount of water of humidification is outputted to the humidifier unit control device 54 of the humidifier device 52.

The humidifier unit control device 54 decides the number of mist atomizers to be operated, and the operating performance and the duty ratio for each of the mist atomizers equipped in the mist humidifier unit 53 such that mists corresponding to the amount of water of humidification calculated by the humidifying amount calculation device 63 is supplied to the fuel gases.

The mist humidifier unit 53 operates each of the mist atomizers in accordance with the number of mist atomizers to be operated and the operating performance and the duty ratio thereof determined by the humidifier unit control device 54 and adds mists corresponding to the amount of water of humidification to the fuel gases supplied from the CO oxidizing device 34. Then, mist-added fuel gases are supplied on the side of the anode of the fuel cell 40.

Since control for the amount of humidification on the side of the cathode can be conducted in accordance with the same procedures as those explained with reference to FIG. 2, detailed explanations therefor are to be omitted.

When the fuel gases controlled for the amount of water of humidification in accordance with the change of the S/C ratio and air controlled for the amount of humidification independently of the side of the anode are supplied to the fuel cell 40, electrode reactions proceed in the fuel cell 40 to change the operating electric current and the operating voltage of the fuel cell 40.

The operating electric current and operating voltage are detected by the current control device 61 and the operating current is compared with the instructed amount of electric current supplied from the electric current rate control device 61a. Then, the foregoing controls are repeated till the operating electric current is equal with the instructed amount of electric current. A feed forward control may be conducted instead of the feedback control described above, like that the case shown in FIG. 2.

As described above, by the method of changing the S/C ratio in accordance with the electric current and the electric current rate and controlling the amount of mist humidification on the side of the anode in accordance with the change of the S/C ratio, humidification can be applied on the side of the anode and on the side of the cathode with no excess or insufficiency even if abrupt load-change occurs, and the fuel cell 40 can be operated stably.

Explanations have been made in details with reference to the preferred embodiments of the present invention but the invention is not restricted to the embodiments described above but various modifications are possible within a range not departing the scope of the present invention.

For example, in the embodiment described above, the method of controlling the amount of mist humidification has been explained specifically to a fuel cell system for use in an onboard power source, such control for the amount of mist humidification is identical in other application uses, for example, a fixed type small-sized electric generators, and process gases can be humidified with no excess or insufficiency by individually controlling the amount of humidification intermittently between the side of the anode and the side of the cathode in accordance with the change of load or change of the S/C ratio, and the fuel cell system can be operated stably.

Further, in the embodiment described above, explanations have been made to a fuel cell system using the solid polymer fuel cell, but control for the amount of humidification is identical in other fuel cells requiring water control for the electrolyte such as a phosphoric acid fuel cell and alkaline fuel cell, and process gases can be humidified with no excess or insufficiency by intermittently controlling the amount of humidification on the side of the anode and on the side of the cathode individually by using a control parameter optimal to the control for the amount of humidification to the fuel cell, and the fuel cell system can be operated stably.

Further, the embodiment described above has a constitution of disposing the humidifier device to the outside of the fuel cell but a portion of the humidifier device, for example, a mist humidifier unit may be incorporated in the fuel cell or in the CO oxidizing device, by which similar effects with those of the embodiment described above can be obtained.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A humidifier device for use in fuel cells, comprising:
   a mist humidifier unit connected and adapted to add mist to a process gas supplied to an electrolyte in a fuel cell, said mist humidifier unit comprising a plurality of individually controllable mist atomizers, wherein said process gas is at least one of a fuel gas supplied to an anode of the fuel cell and an oxidizing gas supplied to a cathode of the fuel cell;
   a humidifier unit control device connected and adapted to, selectively and individually operate at least one of said mist atomizers of said mist humidifier unit in accordance with an operating condition in said fuel cell.

2. The humidifier device according to claim 1, wherein said at least one of the mist atomizers has a duty ratio controlled by said humidifier unit control device.

3. The humidifier device for use in fuel cells according to claim 1, wherein said operating condition is at least one selected from the group consisting of: electric resistance; temperature distribution; cell voltage; an operating current; and a supply amount of the process gas.

4. The humidifier device for use in fuel cells according to claim 1, wherein said fuel cell is any one of a solid polymer fuel cell, a phosphoric acid fuel cell and an alkaline fuel cell.

5. A water control device for use in fuel cell systems comprising:
   a mist humidifier unit for adding mists to a process gas supplied to an electrolyte equipped in a fuel cell;
   a water supply unit for supplying water as one of materials for reforming reaction to a fuel reforming device for converting said process gas; and
   a control device for making a balance between an amount of the water added to said process gas by way of said mist humidifier unit and an amount of the water supplied to said fuel reforming device by way of said water supply unit in accordance with an operating condition and control characteristics of said fuel cell.

6. The water control device according to claim 5, further comprising a humidifier unit control device and an electrolyte membrane water content calculating device, wherein said humidifier unit control device is adapted to control said mist humidifier unit in accordance with a relation for a level between the water content calculating device and a predetermined threshold water content.

7. The water control device according to claim 6, wherein said control device further comprises an electric resistance detection device connected and adapted to detect a cell electric resistance in the fuel cell, and to output a signal to said electrolyte membrane water content calculating device.

8. The water control device for use in fuel cell systems according to claim 5, wherein said fuel reforming device comprising:

an evaporator for vaporizing the materials for reforming reaction including water by heating;

a reforming device for converting a reformate gas containing hydrogen as a main ingredient by reactions between the vaporized materials for reforming reaction; and an oxidizing device for selectively oxidizing carbon monoxide contained in the reformate gas converted by said reforming device thereby lowering the content of the carbon monoxide in the reformate gas.

9. The water control device for use in fuel cell systems according to claim 8, wherein the amount of the water supplied to said fuel reforming device and the amount of the water added to said process gas by said mist humidifier unit are controlled in accordance with the change in a S/C ratio in the reformate gas converted by said reforming device.

10. The water control device for use in fuel cell systems according to claim 9, wherein said operating condition is at least one selected from the group consisting of: a reformate ratio by said reforming device; CO content; reformate gas temperature; and delay time in supplying process gas.

11. The water control device for use in fuel cell systems according to claim 5, wherein said mist humidifier unit comprises a plurality of individually controllable mist atomizers and at least one of them is controlled individually and selectively in accordance with said operating condition of said fuel cell.

12. The water control device for use in fuel cell systems according to claim 5, wherein said fuel cell is any one of a solid polymer fuel cell, a phosphoric acid fuel cell and an alkaline fuel cell.

13. The water control device for use in fuel cell systems according to claim 5, wherein said fuel cell systems having a fuel cell operating system comprising:

fuel gas supply means for supplying a fuel gas to an anode of a fuel cell;

oxidizing gas supply means for supplying an oxidizing gas to a cathode of said fuel cell;

first mist adding means for adding water to the fuel gas;

second mist adding means for adding water to the oxidizing gas;

first control means for variably controlling an amount of the water in accordance with an operating condition of said fuel cell; and a second control means for variably controlling an amount of the water in accordance with said operating condition of said fuel cell.

14. The water control device for use in fuel cell systems according to claim 13, wherein said first mist adding means comprises a plurality of individually controllable mist atomizers, wherein at least one of said mist atomizers is controlled individually and selectively in accordance with said operating condition of said fuel cell.

15. The water control device for use in fuel cell systems according to claim 13, wherein said operating condition of said fuel cell is at least one selected from the group consisting of electric resistance; temperature distribution; cell voltage; operating current; the supply amount of the process gas; and the supply amount of the oxidizing gas.

16. The water control device for use in fuel cell systems according to claim 13, wherein said fuel gas supplying means comprises a fuel reforming device, the fuel reforming device comprising:

an evaporator for superheating to evaporate water and fuel as materials for a reforming reaction;

a reforming device for converting a reformate gas containing hydrogen as a main ingredient by reactions between the vaporized materials for the reforming reaction; and an oxidizing device for selectively oxidizing carbon monoxide contained in the reformate gas converted by said reforming device, thereby lowering the content of the carbon monoxide in the reformate gas.

17. The water control device for use in fuel cell systems according to claim 16, further comprising third control means for controlling an amount of the water supplied to said evaporator in accordance with said operating condition of said fuel cell, and wherein the amount of water controlled by said third control means and the amount of water added to the fuel gas variably controlled by said first control means are concertedly controlled.

18. The water control device for use in fuel cell systems according to claim 17, wherein said operating condition for the concerted control is at least one selected from the group consisting of: a reformate ratio by said reforming device; CO content; reformate gas temperature; and delay time in supplying process gas.

19. The water control device for use in fuel cell systems according to claim 16, further comprising third control means for controlling an amount of the water supplied to said evaporator in accordance with said operating condition of said fuel cell, and wherein the amount of water controlled by said third control means, the supply amount of the oxidizing gas variably controlled by said second control means and the amount of water added to the fuel gas variably controlled by said first control means are concertedly controlled.

20. The water control device for use in fuel cell systems according to claim 19, wherein said operating condition for the concerted control is at least one selected from the group consisting of: a reformate ratio by said reforming device; CO content; reformate gas temperature; and delay time in supplying process gas.

21. The water control device for use in fuel cell systems according to claim 13, wherein said fuel cell is any one of a solid polymer fuel cell, a phosphoric acid fuel cell and an alkaline fuel cell.

* * * * *

UNITED STATES PATENT AND TRADEMARK OFFICE
CERTIFICATE OF CORRECTION

PATENT NO.     : 6,500,573 B1
DATED          : December 31, 2002
INVENTOR(S)    : Shimazu et al.

It is certified that error appears in the above-identified patent and that said Letters Patent is hereby corrected as shown below:

<u>Title page,</u>
Items [75] and [12] should read:

-- [12] United States Patent
       Shimazu et al. --

-- [75] Inventors: Takashi Shimazu; Hiroshi Aoki; Tomohisa Wakasugi; Takahiko Asaoka; Kazutaka Hiroshima; Yutaka Ohya; Katsuhito Yamada, all of Aichi-Ken (JP) --

Signed and Sealed this

Thirteenth Day of May, 2003

JAMES E. ROGAN
*Director of the United States Patent and Trademark Office*